United States Patent [19]

Imoberdorf

[11] 4,109,552

[45] Aug. 29, 1978

[54] INDEXING MECHANISM FOR ROTATABLE ELEMENT OF MACHINE-TOOL

[75] Inventor: Markus Imoberdorf, Oensingen, Switzerland

[73] Assignee: Imoberdorf & Co., Oensingen, Switzerland

[21] Appl. No.: 749,601

[22] Filed: Dec. 13, 1976

[30] Foreign Application Priority Data

Dec. 18, 1975 [CH] Switzerland .................. 16455/75

[51] Int. Cl.$^2$ .................. B23Q 17/02; B23Q 17/18
[52] U.S. Cl. .................. 74/813 L; 74/816; 74/822; 74/128; 192/17 R
[58] Field of Search .................. 74/813 L, 816, 822, 74/128; 192/17 R

[56] References Cited

U.S. PATENT DOCUMENTS

| | | | |
|---|---|---|---|
| 1,653,318 | 12/1927 | Stickney | 74/822 |
| 2,461,631 | 2/1949 | Darash | 74/822 |
| 2,622,487 | 12/1952 | Schultz | 74/822 |
| 3,965,775 | 6/1976 | Pinkesfeld | 74/816 X |

*Primary Examiner*—Irwin C. Cohen

*Attorney, Agent, or Firm*—Silverman, Cass & Singer, Ltd.

[57] ABSTRACT

An indexing mechanism for the rotatable element of a machine tool wherein a shaft is coaxial with the element and has formed thereon a helicoidal groove. A control member is engaged in said groove and moves alternately therein to transmit an oscillating rotative movement to the shaft to effect go-and-back movements along the groove in a direction parallel to the axis of rotation of the rotatable element. A control cam effects go-and-back movements which are synchronized with the movements of the control member. A driving member is mounted on the shaft for rotation therewith and is capable also of axial movement between one position in which it is rigid with the element and a second non-rigid position. The axial movement of the driving member is controlled by the cam. Accordingly, during the go movements of the control member and of the cam, the driving member is rigid with the element. During the back movements of said control member and the cam, the driving member is released from the element, said driving member being rotatable backwards without driving the element.

10 Claims, 8 Drawing Figures

INDEXING MECHANISM FOR ROTATABLE ELEMENT OF MACHINE-TOOL

The present invention relates to an indexing mechanism for a rotatable element of machine-tool.

This mechanism is characterized by the fact that it comprises a shaft coaxial to the said element, a control member effecting go-and-back movements in a direction which is parallel to the axis of rotation of this element, this control member being engaged in a groove, at least a portion of which is helicoidal, provided in the shaft, so that the alternative movements of the control member transmit to the shaft an oscillating rotative movement, a control cam effecting go-and-back movements which are synchronised with these ones of the control member and a driving member mounted on the shaft so as to be rigid therewith angularly while being able to move axially with respect to this shaft between two positions in one of which it is rigid with the element to be indexed and in the other of which it is not rigid therewith, this driving member being controlled, in its axial movements, by the same cam, the whole being arranged in such a way that, during the go movements of the control member and of the cam, the driving member, which rotates with the shaft, be rigid with the element to be indexed, that it drives then, while, during the back movements of the control member and of the cam, the driving member be released from the element to be indexed and effects consequently its rotatable movements in backward direction without driving the said element.

The drawing shows, by way of example, one embodiment of the object of the invention.

Figure 1:
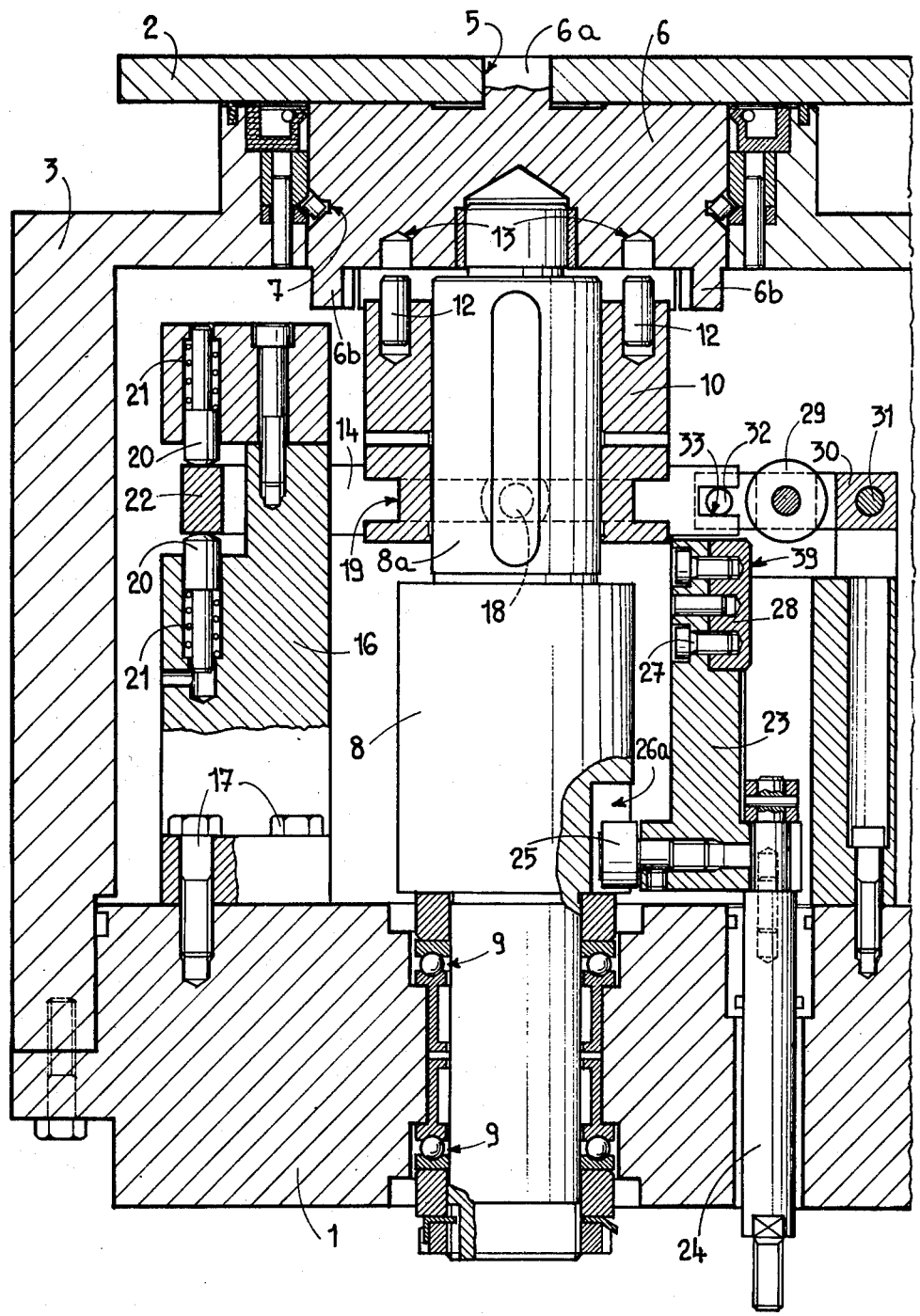
FIG. 1 is an axial sectional view of a part of a machine-tool, representing the indexing mechanism of a rotatable table of this machine.

The machine as represented, for instance a transfer-machine, comprises a main frame including a base-plate 1 carrying a rotatable table 2 carried by a bell-shaped stationary frame 3 secured to the frame 1. The frame 3, of polygonal general outer shape, has its lateral faces, such as faces 4 represented in FIG. 2, intended to receive working units.

The table 2 is provided with a central hole 5 by means of which it is forced on a journal 6a of a member 6, constituting a hub, supported by the frame 3 by means of an abutting bearing 7.

The indexing of the table 2 is produced by a shaft 8, coaxial to the hub 6, which is rotatably mounted in the frame 1 by means of ball-bearings 9. This shaft 8 shows, in the vicinity of its upper end, a portion 8a on which is engaged a driving member 10 of the table 2 rendered angularly rigid with the shaft by means of a key 11 (FIG. 2) while being able to move longitudinally on the portion 8a. This driving member 10 carries two pins 12, diametrically opposed, axially directed, each one of which is situated opposite one of several recesses 13 provided in the hub 6.

The driving member 10 is submitted to the action of a pair of first oscillating levers 14 articulated each at 15 on a bracket 16 of the frame of the machine, and which is secured to the base-plate 1 of this frame by means of screws 17. These two levers 14 each carry a pin 18 engaged into an annular groove 19 of the driving member 10. Hence, when the levers 14 are moved in one sense or in the other, with respect to an intermediary position, of rest, represented in the drawing, the driving member 10 is moved axially, in one sense or in the other, on the portion 8a of the shaft 8. An elastic return device urges the levers 14 in their intermediary rest position. This return device comprises two pushers 20 sliding in the frame of the machine and which are submitted each to the action of a coil spring 21 which urges them against a transversal member 22 interposed between the two levers 14 at the end of these latters situated in the vicinity of their articulation 15. Thus, when the levers 14 are moved in one sense or in the other one, in a rocking movement around their articulation 15, one or the other of the pushers 20 is moved, compressing the corresponding spring 21, this spring then urging the levers 14 back into their rest position.

Figure 3:
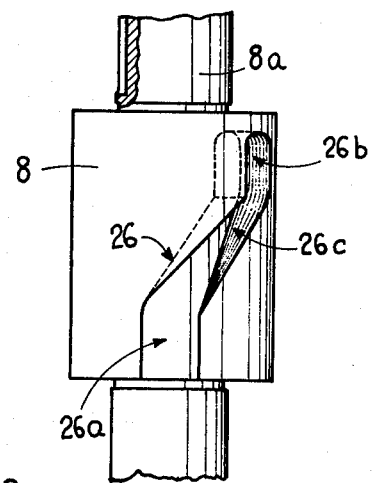
FIG. 3 is an elevational view of a detail, with partial section.

The shaft 8 is submitted to the action of a control mechanism comprising a control member 23 effecting a vertical go-and-back movement, operated by a pilot cylinder, not represented, with a piston of which it is connected by a rod 24 (FIG. 1). This control member 23 carries a control roller 25 engaged in a groove 26 provided in the shaft 8. As shown in FIG. 3, the groove 26 has two end portions 26a and 26b which are parallel to the axis of the shaft 8, and an intermediary portion 26c which is helicoidal. Hence, during the vertical go-and-back movements of the control member 23, the shaft 8 remains stationary when the roller 25 runs along the two end portions 26a and 26b of the groove 26, while it is driven in rotation when the roller 25 runs along the helicoidal portion 26c of the groove 26.

The control member 23 carries, secured by screws 27, a stop-block 28, constituting a cam, intended to cooperate with a roller 29 carried by a second oscillating lever, having the shape of a stirrup, designated by 30, articulated at 31 on the frame of the machine. Each of the branches, designated by 30a, of the stirrup-shaped lever 30 carries a pin 32 engaged in a longitudinal notch 33 provided in the free end of each of the levers 14.

It results from this arrangement that any rocking movement of the stirrup-shaped lever 30 from its rest position represented in the drawing produces a corresponding rocking movement of the pair of the oscillating levers 14.

The machine comprises moreover a locking device of the table 2 represented in detail in FIGS. 4 to 7. This locking device comprises a locking member 34 having the shape of a lever, articulated on the bell-shaped frame 3 by means of an axis 35 parallel to the shaft 8, and which is submitted to the action of a return spring 36 urging its end 34a, which has the shape of a beak, against an annular sleeve-shaped portion 6b of the hub 6. It is to be noted that the spring 36 could be replaced by a pneumatic return device.

The driving member 10 carries a pin 37, radially directed, the end of which is conical, intended to cooperate, during the axial displacements of the said member, with the locking member 34. When the member 10 occupies the axial position represented in FIG. 4, the pin 37 authorizes the beak 34a of the locking member to enter into one or the other notches 38 provided in the sleeve-shaped portion 6b of the hub 6 while, when the member 10 occupies the axial and angular position represented in FIG. 6, the pin 37 acts on the locking member 34 for bringing it into an eclipsed position, against the action of the return spring 36, position in which the beak 34a is out of the notches 38.

Figure 2:
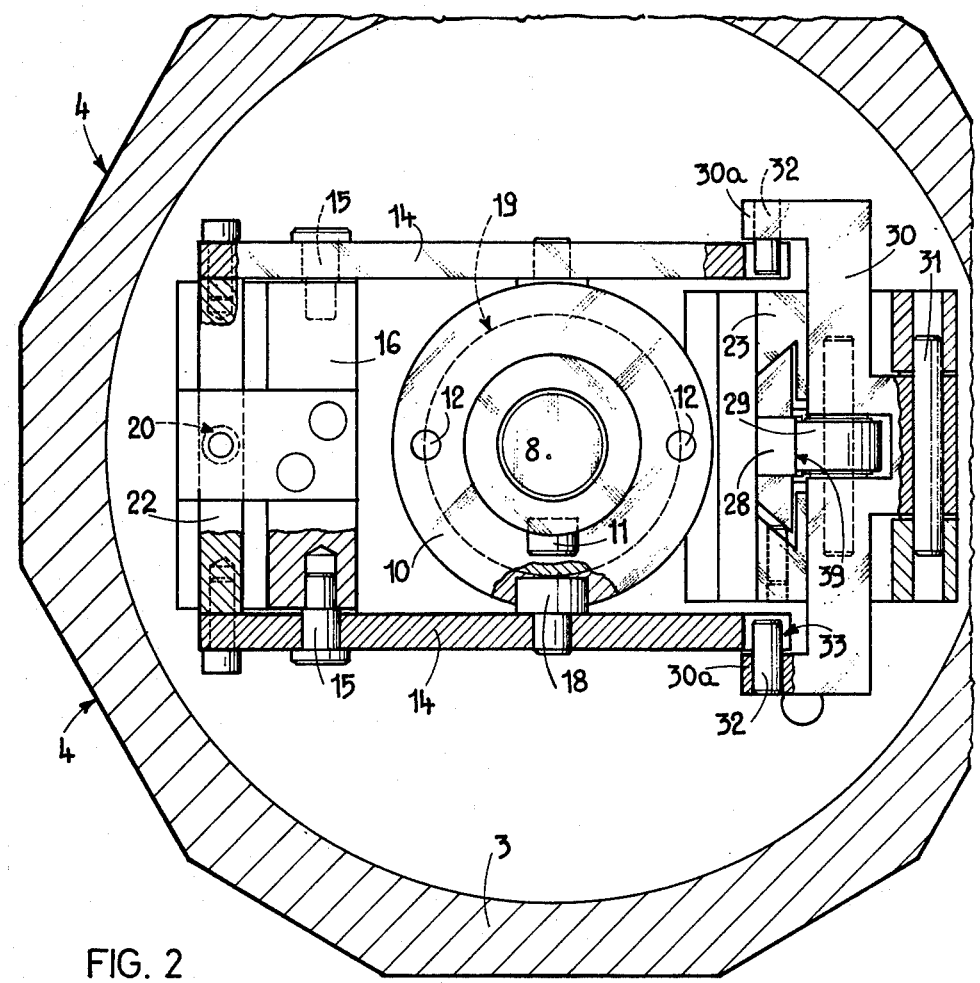
FIG. 2 is a transversal sectional view of this part of the machine.
Figure 8:
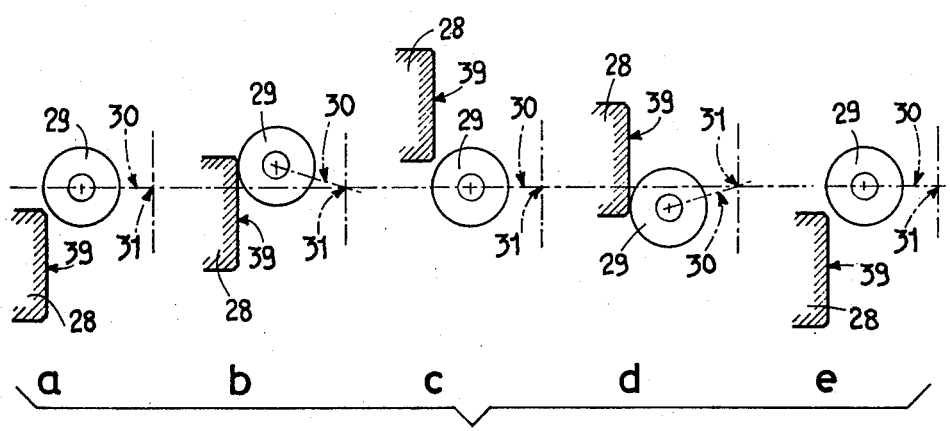
FIG. 8 represents diagrammatically an element of the mechanism in several different working positions.
Figure 5:
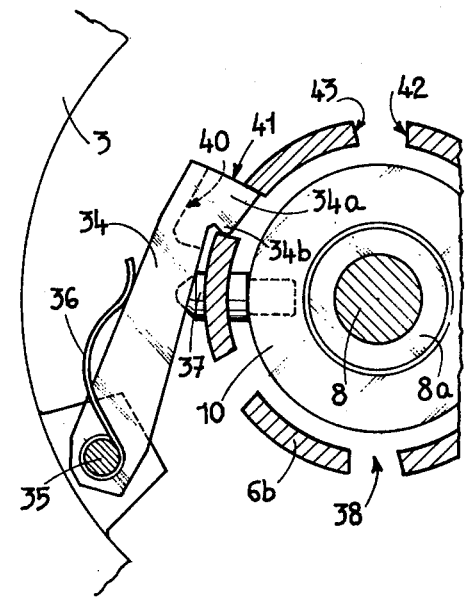
FIG. 5 is a sectional view along line V—V of FIG. 4.
Figure 4:
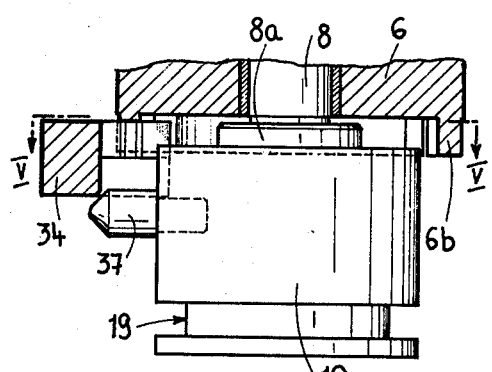
FIG. 4 is an elevational view of another detail, also with a partial section.
Figure 7:
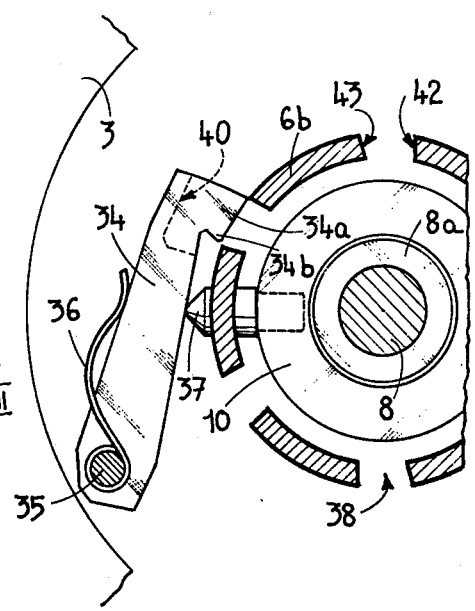
FIG. 7 is a sectional view along line VII—VII of FIG. 6.
Figure 6:
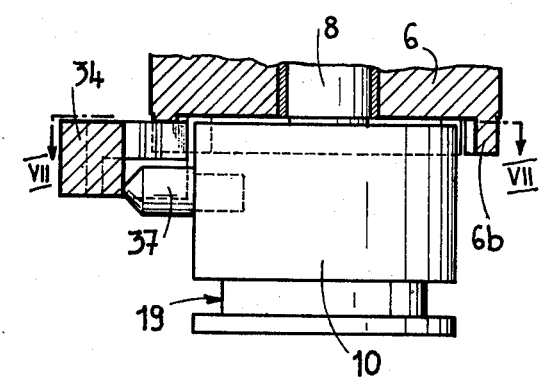
FIG. 6 is an elevational view, with partial section, of the same detail as this one of FIG. 4, but in a different working position.

The operation of the mechanism as disclosed and represented is the following:

When this mechanism occupies the position represented in FIGS. 1 and 2, as well as in FIGS. 4 and 5 and in FIG. 8a, the driving member 10 is free from the hub 6, but the table is locked by the locking member 34 the beak 34a of which is then engaged in one of the notches 38 of the sleeve-shaped portion 6b of the hub 6.

When an indexing of the table 2 must take place, the control member 23 moves upwards; in the beginning of the run of the member 23, the roller 25 runs along the portion 26a of the groove 26 of the shaft 8, so that this shaft is not driven. The cam 28 encounters, during its upward movement, the roller 29 carried by the stirrup-shaped lever 30 due to the fact that the relative position of these two elements —cam and roller— is such that the plane of the front face of the cam 28, designated by 39 (FIGS. 1 and 8), intersects the roller 29 when the mechanism is at rest. The lever 30 being lifted by the cam 28, it produces the rocking of the pair of levers 14, that produces an axial upward movement of the driving member 10 the pins 12 of which enter then into the two recesses 13 of the hub 6. The driving member 10 is thus made angularly rigid with the hub 6.

Simultaneously, during the upward displacement of the driving member 10, the pin 37 of the member 10 acts on the locking member 34 for releasing its beak 34a from the notch 38 in which it was engaged, releasing thus the table 2 which, it is to be noted, is then prevented from effecting any untimely movement by the fact that it is maintained by the member 10.

The control member 23 continuing its upward movement, the roller 25 runs along the helicoidal portion 26c of the groove 26, that produces a rotatable movement of the shaft 8 which is communicated to the table 2 through the intermediary of the driving member 10 and of the hub 6.

During this movement of the control member 23, the roller 29 rolls on the rolling surface constituted by the face 39 of the cam 28, that permits to this cam to move without producing any supplementary movement of the stirrup-shaped lever 30, but prevents this lever from returning into its rest position. This step of the process is represented in FIG. 8b.

It is to be noted that, during the rotatable movement of the driving member 10, its pin 37 slides along the locking member 34 up to the moment where it comes opposite a recess 40 provided in the locking member 34. This permits to the locking member to return against the sleeve-shaped portion 6b of the hub 6 even while the driving member 10 is still in its upper position. At the moment where the roller 25 releases the helicoidal portion 26c of the groove 26 of the shaft 8 for engaging the terminal portion 26b, one of the notches 38 of the sleeve-shaped portion 6b of the hub 6 is opposite the beak 34a of the locking member 34 so that this beak enters into this notch, thus locking again the table. It is to be noted that the driving pins 12 have a small play in the holes 13 of the hub 6 so that the beak 34a of the locking member can enter easily into each of the notches 38. Moreover, the lateral face 41 of the beak 34a is constituted by a portion of cylinder the center of which coincides with the center of articulation 35 of the locking member, while one of the walls of each of the notches 38, designated by 42, shows a concave surface of corresponding shape; the beak 34a is provided with a protrusion 34b, constituting a wedge, bearing on the wall, designated by 43, of each notch 38 opposed to its wall 42. Hence the table 2 is locked in angular positions which are prefectly exact, without any play.

The upward movement of the control member 23 then continues, the roller 25 running along the terminal portion 26b of the groove 26 of the shaft 8, so that this shaft is no longer driven in rotation. When the cam 28 goes beyond the roller 29, this roller falls again and the lever 30, as well as the pair of levers 14, return into their rest position, represented in the drawings, in which they are maintained by the pushers 20 urged by the springs 21. During this movement of the levers 30 and 14, the control member 10 is brought back downwards, releasing the pins 12 from the recesses 13 of the hub 6. This position is diagrammatically represented in FIG. 8c.

The control member 23 starts then with its downward movement during which the cam 28, encountering the roller 29, pushes this roller downwards, that makes the stirrup-shaped lever 30 and the pair of levers 14 to rock downwards, this movement being authorized by the fact that the driving member 10, which follows the levers 14, has the possibility of moving downwards beyond its rest position, that in order to permit to the cam 28 to come again into its initial start position in which it is situated under the roller 29.

During this downward movement of the control member 23, the roller 29 runs again on the rolling surface 39 of the cam 28 (FIG. 8d), and the roller 25 runs along the helicoidal portion of the groove 26 of the shaft 8 which then rotates in the counter direction for coming again into its initial angular position, this movement being without effect on the table 2 since the pins 12 are then released from the recesses 13 of the hub 6.

When the roller 29 has passed over the rolling surface 39 of the cam 28, it is released and, under the action of the upper pusher 20, urged by the corresponding spring 21, the levers 14 as well as the lever 30 return into their rest position represented in FIGS. 1, 2 and 8e.

The whole elements of the mechanism occupy then again a position permitting a new cycle of operation to start. It is to be noted that the rotatable movement in backward direction of the control member 10 does not produce any untimely releasing of the locking member 34 since, before this rotatable movement is effected, the member 10 is returned downwards, releasing its protrusion 37 from the locking member 34.

What I claim is:

1. An indexing mechanism comprising, a rotatable element, a shaft arranged coaxial to said rotatable element, a control member capable of effecting alternative go-and-back movements in a direction which is parallel to the axis of rotation of said rotatable element, means defining a groove in said shaft at least a portion of which is helicoidal means connected to said control member engaged in said groove whereby the alternative movements of the control member transmit an oscillating rotative movement to said shaft, a control cam constructed and arranged to effect go-and-back movements synchronised with the alternative go-and-back movements of said control member, a driving member, clutch means between said driving member and said rotatable element, means mounting said driving member on said shaft against angular movement relative thereto yet capable of axial movement therealong between first and second positions, the first position being a clutch engaged position whereat said driving member is rigid with said rotatable element and the second position being a clutch disengaged position whereat said driving member is not rigid with said rotatable element, said cam being effective to control the axial movements of said driving member whereby during the go movements of the control member and of the cam, the driving member engages the rotatable element while, during the back movements of the control member and of the cam, said driving member is released from said rotatable element and is disengaged from said rotatable element during the movement thereof in backward direction, and lever means establishing the connection between said cam and said driving member.

2. An indexing mechanism as claimed in claim 1 wherein said lever means comprises a first oscillating lever coupled to the driving member for displacing said driving member axially with respect to the shaft and a second oscillating lever, said control cam operable upon said second oscillating lever to in turn operate said first lever.

3. An indexing mechanism as claimed in claim 2, wherein said cam comprises a roller carried by said second oscillating lever, said stop-block having a rolling surface for the said roller and disposed in a plane intercepting said roller when said oscillating levers are at rest, whereby when the cam moves upwards, said cam encounters the roller and lifts said roller to produce a rocking movement of said second oscillating lever thereby producing rocking movement of said first oscillating lever to cause said driving member to engage said rotatable element whereby said cam travels beyond the roller to continue its upward displacement with the roller rolling on said rolling surface to produce rotation of said shaft and, consequently, of the rotatable element and when the roller has passed over the rolling surface of the cam, the falling down of said second oscillating lever is effected and said second lever is no longer retained by said roller in contact with said cam whereby to return into its rest position, as well as that of the first oscillating lever, that produces the return into its rest position of the driving member which is disengaged from said rotatable element and that, during the back movements of the cam downwards, the cam encounters the roller and moves said roller downwards, producing a rocking movement of said second oscillating lever until the roller arrives opposite the rolling surface of said cam said roller continuing to roll thereon during the continuation of the movement of said cam downwards, until the roller having passed over said rolling surface is disengaged from said cam, permitting both said second oscillating lever and said first oscillating lever to return and a return device to return said levers to a rest position to bring said mechanism to initial starting condition.

4. An indexing mechanism as claimed in claim 3, in which one of said first and second oscillating levers has a protrusion and the other has an elongated aperture capable of receiving said protrusion whereby any rocking movement of one of said levers produces a rocking movement of the other lever.

5. An indexing mechanism as claimed in claim 3, wherein said driving member includes an annular groove and a protrusion carried by said first lever is engaged in said annular groove of the driving member whereby any rocking movement of said first lever produces a longitudinal movement of the driving member.

6. An indexing mechanism as claimed in claim 1, wherein one of said driving member and rotatable element has at least one protrusion directed axially, the other element having a recess formed therein at a location opposite said protrusion engaging within said recess when said driving member is moved by said first oscillating lever in the direction of the rotatable element, said at least one protrusion and recess defining said clutch means.

7. An indexing mechanism as claimed in claim 3, wherein said return device is arranged to operate in the two senses of displacement of said levers for urging them into their rest position.

8. An indexing mechanism as claimed in claim 1, wherein said means connected to said control member engaged in said groove is a roller, said groove having two portions parallel to the axis of the shaft and being bound by an helicoidal portion, whereby in the beginning and at the end of the run of the control roller, said shaft is not driven in rotation, said shaft being driven only in the intermediary portion of the run of the roller when said roller runs along the helicoidal portion of said groove.

9. An indexing mechanism as claimed in claim 8, wherein said roller and said control cam are carried by a common control member effecting vertical go-and-back movements.

10. An indexing mechanism as claimed in claim 1, comprising said rotative element having a locking device including a locking lever articulated around an axis parallel to the axis of said shaft and a beak (3a) formed on the end of said locking lever being engageable into one or the other recesses carried by said rotatable element dependent upon the angular position of said rotatable element, said driving member having a protrusion cooperating with said locking lever for bringing said locking lever into an eclipsed position against the action of a return device in which said beak is released from said recesses, the portion of the said locking lever cooperating with said protrusion to present such a configuration that, even while said driving member occupies its axial position in which the protrusion thereof cooperates with the lever, this latter can, according to and dependent upon the angular position occupied by said driving member, to return into a position in which the beak thereof is engaged within a recess of said rotatable element.

* * * * *